(12) United States Patent
Vahle

(10) Patent No.: US 12,438,352 B2
(45) Date of Patent: Oct. 7, 2025

(54) JUNCTION BOX AS A PROTECTED CHARGING SOCKET FOR AN ELECTRIC VEHICLE

(71) Applicant: AUDI AG, Ingolstadt (DE)

(72) Inventor: Sebastian Vahle, Landshut (DE)

(73) Assignee: AUDI AG, Ingolstadt (DE)

( * ) Notice: Subject to any disclaimer, the term of this patent is extended or adjusted under 35 U.S.C. 154(b) by 220 days.

(21) Appl. No.: 18/318,559

(22) Filed: May 16, 2023

(65) Prior Publication Data

US 2023/0378731 A1  Nov. 23, 2023

(30) Foreign Application Priority Data

May 19, 2022 (DE) ...................... 10 2022 112 557.2

(51) Int. Cl.
  *H02G 3/08* (2006.01)
  *B60L 53/16* (2019.01)

(52) U.S. Cl.
  CPC .............. *H02G 3/083* (2013.01); *B60L 53/16* (2019.02)

(58) Field of Classification Search
  CPC .......... H02G 3/08; H02G 3/081; H02G 3/083; H02G 3/14; H05K 5/03; H05K 5/02; H05K 5/00; H01H 9/02; H01H 9/0264; H01R 13/639; H01R 13/6392; H01R 13/6397
  USPC ........... 174/480, 481, 50, 53, 57, 58, 66, 67; 220/3.2–3.9, 4.02, 241, 242; 439/135, 439/133, 136, 147
  See application file for complete search history.

(56) References Cited

U.S. PATENT DOCUMENTS

| | | | | |
|---|---|---|---|---|
| 3,524,029 A | * | 8/1970 | Laff ..................... | H01R 13/639 200/51 R |
| 4,479,688 A | * | 10/1984 | Jennings ............ | H01R 13/6397 439/304 |
| 4,603,931 A | * | 8/1986 | Ruffman ............ | H01R 13/6397 439/304 |
| 4,674,813 A | * | 6/1987 | Feldner .............. | H01R 13/6397 439/304 |
| 4,784,610 A | * | 11/1988 | Stuart ................. | H01R 13/633 174/67 |
| 4,851,612 A | * | 7/1989 | Peckham ........... | H01R 13/6395 174/67 |
| 4,968,856 A | * | 11/1990 | Bowley ............... | H01R 13/447 174/67 |
| 5,078,614 A | * | 1/1992 | Shotey ................ | H01R 13/447 174/67 |

(Continued)

FOREIGN PATENT DOCUMENTS

DE  202010015794 U1  3/2012
DE  102017105425 A1  9/2017

(Continued)

OTHER PUBLICATIONS

Office Action, dated Mar. 15, 2023, for German Patent Application No. 10 2022 112 557.2 (5 pages).

*Primary Examiner* — Angel R Estrada
(74) *Attorney, Agent, or Firm* — Seed Intellectual Property Law Group LLP

(57) ABSTRACT

A junction box is provided comprising a housing, a socket arranged in the housing for plugging in the plug of a cable, and a cover movably mounted on the housing and covering an opening of the housing in a covering position. A charging socket for an electric vehicle, an electric vehicle, and a method for operating a junction box are also provided.

8 Claims, 3 Drawing Sheets

(56) References Cited

U.S. PATENT DOCUMENTS

| | | | | |
|---|---|---|---|---|
| 5,243,135 A | * | 9/1993 | Shotey | H02G 3/14 174/67 |
| 5,362,924 A | * | 11/1994 | Correnti | H01R 13/447 174/67 |
| 5,389,740 A | * | 2/1995 | Austin | H02G 3/14 174/67 |
| 6,309,239 B1 | * | 10/2001 | Johnston | H01R 13/447 174/67 |
| 6,372,987 B1 | * | 4/2002 | Ha | H02G 3/14 174/67 |
| 6,891,104 B2 | * | 5/2005 | Dinh | H02G 3/14 439/11 |
| 6,916,989 B2 | * | 7/2005 | Broussard, Jr. | H02G 3/14 174/67 |
| 7,097,474 B1 | * | 8/2006 | Naylor | H01R 13/6397 174/67 |
| 7,511,219 B2 | * | 3/2009 | Dinh | H02G 3/088 174/67 |
| 8,088,999 B1 | * | 1/2012 | Payou | H02G 3/14 174/67 |
| 8,563,859 B1 | * | 10/2013 | Baldwin | H02G 3/14 174/67 |
| 8,622,759 B2 | * | 1/2014 | O'Connell | H01R 13/6397 439/373 |
| 9,199,551 B2 | * | 12/2015 | Kahara | B60L 53/18 |
| 10,266,058 B2 | * | 4/2019 | Scherdin | B60L 53/14 |
| 10,276,319 B1 | * | 4/2019 | Birdsong | H02G 3/14 |
| 10,665,978 B1 | * | 5/2020 | Vera | H01R 13/6395 |
| 2011/0240363 A1 | | 10/2011 | Dinh | |
| 2017/0259785 A1 | | 9/2017 | Lovett et al. | |
| 2019/0066416 A1 | | 2/2019 | Dhillon et al. | |

FOREIGN PATENT DOCUMENTS

| | | |
|---|---|---|
| DE | 102016112613 A1 | 1/2018 |
| DE | 102018120358 A1 | 2/2019 |
| WO | 2018035523 A1 | 2/2018 |
| WO | 2021105928 A1 | 6/2021 |

\* cited by examiner

JUNCTION BOX AS A PROTECTED CHARGING SOCKET FOR AN ELECTRIC VEHICLE

BACKGROUND

Technical Field

Embodiments of the present disclosure relate to a junction box, comprising a housing, a socket arranged in the housing for plugging in the plug of a cable and a cover, movably mounted on the housing and covering an opening of the housing in a covering position. Some embodiments relate to a charging socket for an electric vehicle, an electric vehicle, and a method for operating a junction box.

Description of the Related Art

Junction boxes of the mentioned kind belong to the prior art in various configurations and serve for protecting a socket arranged in the junction box or a plug arranged in the socket. The cover in a covering position closes off the opening of the junction box and prevents the damaging of the socket or the plug due to moisture or dirt.

Thus, the document WO 2021/105928 A1 discloses a charging device for an electric vehicle, comprising a junction box with a housing, which can be installed flush in a floor, a plug of a cable which is arranged in the housing and which can be removed from the housing, and a cover movably mounted on the housing, which closes an opening of the housing in a covering position of the cover.

Electric vehicles each have a junction box, which is customarily arranged on the outside of the particular electric vehicle. The junction box comprises a socket arranged in the junction box for inserting a plug of a charging device, such as that described by the document WO 2021/105928 A1, and a cover which is movable relative to the junction box for covering an opening of the junction box when the electric vehicle is not connected to a charging device.

In order to insert the plug of the charging device into the socket of the junction box of the electric vehicle, the cover of the junction box is moved out of the covering position, so that the opening of the junction box and an access to the socket is opened up. For a successful and safe charging of the electric vehicle, it must be assured that the plug is not accidentally or maliciously disconnected from the socket.

In order to prevent an unwanted disconnecting of the plug from the socket, the document DE 10 2017 105 425 A1 discloses a junction box having a socket for a charging cable. The socket comprises a locking mechanism for the mechanical locking and unlocking of a plug inserted into the socket.

With the same purpose, the document DE 10 2018 120 358 A1 discloses a cable with a plug, comprising a detent element for interlocking with a corresponding undercut of the junction box, an actuator for operating the detent element, and a biometrical sensor for detecting a biometrical identifier. A controller functionally connected to the detent element and the biometrical sensor operates the actuator which a detected biometrical identifier and a biometrical identifier stored in memory match up.

However, each time specially designed and matching sockets and plugs are involved, having a great mechanical complexity and also, in the last mentioned instance, a great electronic complexity.

BRIEF SUMMARY

Some embodiments provide a junction box which supports a typical socket and a typical plug, having little complexity and reliably preventing an unwanted disconnection of the plug from the socket, once inserted into the socket.

Some embodiments include a junction box, comprising a housing, a socket arranged in the housing for plugging in a plug of a cable, a cover movably mounted on the housing and covering an opening of the housing in a covering position. When the cover in the covering position closes the opening of the housing, the socket is protected against dirt or moisture. Such junction boxes are very common, so that there are many possible applications.

In some embodiments, the cover has a passage for the cable with a smaller, largest interior dimension than the smallest exterior dimension of the plug. Thanks to the passage, the cover can be arranged in the covering position when a plug is inserted into the socket. The cover closes off the opening of the junction box and protects the socket and the inserted plug against dirt and moisture. Of course, the junction box has room for the plug so that the inserted plug does not stick out from the opening.

Thanks to the relationship between the interior dimension of the passage and the exterior dimension of the plug, the plug is prevented from passing the cover. In this way, the cover in the covering position secures the plug in the socket and reliably prevents a disconnection of the plug from the socket.

The junction box requires neither a specially designed socket nor a specially designed plug, and consequently it supports typical sockets and plugs. The mentioned effects are achieved by a special simply designed cover, so that the complexity of the junction box is low.

In one embodiment, the cover is mounted on the housing so that it can swivel relative to the housing and the junction box comprises a hinge, connecting the cover to a marginal region of the housing which defines the opening. The hinge is a simple and well proven linkage between the housing and the cover, and it allows the cover a swiveling movement relative to the housing about the marginal region.

In an alternative embodiment, the cover is mounted movably on the housing relative to the housing and the junction box comprises a guide rail for the cover, situated at a marginal region of the housing which defines the opening. The guide rail is a simple and proven means of connection between the housing and the cover. It extends in a plane parallel to the opening of the junction box and allows the cover a sideways translatory movement relative to the housing.

Ideally, the passage is formed as a slot, which starts from one edge of the cover and extends in a central region of the cover, and which has a width defining the maximum diameter of the cable. The slot enables a simple arrangement of the cable in the passage from the direction of the edge and a simple removal of the cable from the passage in the direction toward the edge.

The cover may comprise a slider movably mounted on the cover for releasing or closing the passage. The slider is moved into a closing position when there is no plug inserted in the socket. On the other hand, the slider is moved into a releasing position when a plug has been inserted into the socket. In the closing position, the slider closes the passage and prevents dirt or moisture from getting in through the passage to the junction box.

In some embodiments, the junction box comprises a locking mechanism for locking the cover in the covering position. The locking mechanism prevents the cover from leaving the covering position and it can be configured in known manner, for example, having a bolt and an undercut, where the bolt and the undercut engage with each other when the cover is locked in the covering position, and where the bolt and the undercut are not in engagement with each other when the cover is loose in the covering position.

The junction box can have a closure mechanism for closing the housing with the cover locked in the covering position. The closure mechanism can comprise a lock, in known manner, which is configured and arranged to optionally lock or release the bolt. A key belonging to the lock precludes an unauthorized operation of the lock.

The closure mechanism can alternatively, or additionally, comprise an electrical actuator for optional locking or releasing of the bolt, which is operated, for example, by an application provided by a mobile terminal device.

Some embodiments include a charging socket for an electric vehicle. Every electric vehicle has a charging socket. Accordingly, some embodiments may have diverse applications.

In some embodiments, the charging socket is designed as a junction box. The charging socket reliably prevents an unintentional disconnection of a charging plug of a charging cable of a charging device that has been inserted into the socket. In this way, the charging of the electric vehicle is very secure. The charging cable is secured to the electric vehicle during the charging and protected against theft. In some embodiments, the closure mechanism comprises a vehicle key belonging to the electric vehicle as the coordinated key.

Some embodiments include an electric vehicle, comprising a charging socket arranged on the outside of the electric vehicle. Every electric vehicle has a charging socket. Accordingly, some embodiments may have diverse applications.

Some embodiments include a charging socket. Thanks to the charging socket, a charging of the electric vehicle is secure.

The electric vehicle can alternatively, or additionally, comprise a junction box formed on the outside of the electric vehicle, being designed as a 230 V receptacle. The socket of the junction box is formed corresponding to a 230 V shockproof plug. In some embodiments, the closure mechanism comprises the electrical actuator and enables an operation of the electrical actuator by an application provided by the mobile terminal device.

The junction box is connected across an inverter to a traction battery of the electric vehicle. In this way, the electric vehicle can provide electrical energy for the typical electrical consumer connected to the junction box, such as a household appliance, a tool, or a charger of an e-bike or a mobile terminal device or the like.

Some embodiments include a method for operating a junction box, wherein a plug of a cable is inserted into a socket of the junction box.

In some embodiments, a junction box is provided, the opening of the housing is opened by moving the cover before inserting the plug, after inserting the plug the cable is led through the passage of the cover and the opening of the housing is covered by moving the cover. The handling of the junction box while connecting the cable to the junction box is simple. Of course, the mentioned steps are performed equally easily in the opposite sequence and direction of movement when disconnecting the cable from the junction box.

In some embodiments, the junction box supports a customary socket and a customary plug, has little complexity, and reliably prevents an unwanted disconnection of the plug from the socket once inserted into the socket. Consequently, the junction box is suitable for an electric vehicle and it enhances the safety of charging of the electric vehicle.

BRIEF DESCRIPTION OF THE SEVERAL VIEWS OF THE DRAWINGS

Embodiments of the present disclosure are shown schematically with the aid of two embodiments in the drawings and shall be further described with reference to the drawings.

DETAILED DESCRIPTION

Figure 1:
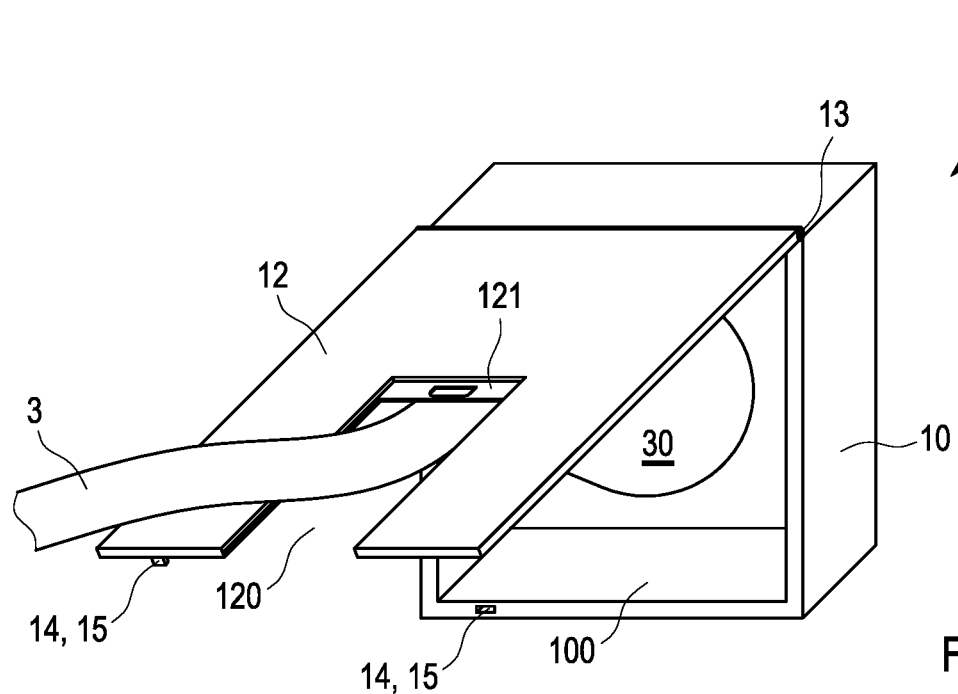
FIG. 1 shows in a perspective front view, a junction box according to a first embodiment with a plug inserted.

FIG. 1 shows in a perspective front view a junction box 1 according to a first embodiment with a plug 30 inserted. The junction box 1 comprises a housing 10 and a socket 11 arranged in the housing 10 (see FIG. 5) for inserting the plug 30 of a cable 3. Moreover, the junction box 1 comprises a cover 12 movably mounted on the housing 10 and covering an opening 100 of the housing 10 in a covering position, having a passage 120 for the cable 3. The cover 12 can have a slider 121 movably mounted on the cover 12 for releasing or closing the passage 120.

The passage 120 has a smaller, largest interior dimension than the smallest exterior dimension of the plug 30. The passage 120 is may be formed as a slot, which starts from one edge of the cover 12 and extends in a central region of the cover 12 and which has a width defining the maximum diameter of the cable 3.

The cover 12 can be mounted on the housing 10 so that it can swivel relative to the housing 10. The junction box 1 then comprises a hinge 13, which connects the cover 12 to a marginal region of the housing 10 which defines the opening 100.

A plug 30 of a cable 3 is inserted into the socket 11 of the junction box 1. The cover 12 is depicted not in the covering position, but instead swiveled by around 45° with respect to the covering position. The slider 121 is in a releasing position, i.e., the passage 120 is opened up.

Figure 2:
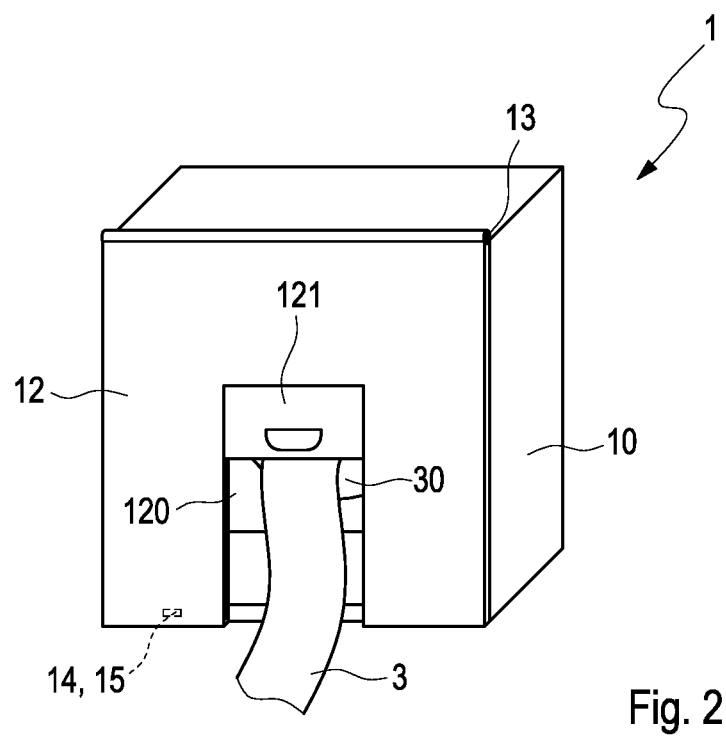
FIG. 2 shows in a top view, the junction box shown in FIG. 1 with the cover in the covering position.

FIG. 2 shows in a top view the junction box 1 shown in FIG. 1 with the cover 12 in the covering position. The cable 3 extends through the passage 120.

The junction box can moreover have a locking mechanism 14 for locking the cover 12 in the covering position and a closure mechanism 15 for closing the housing 10 with the cover 12 locked in the covering position.

Figure 3:
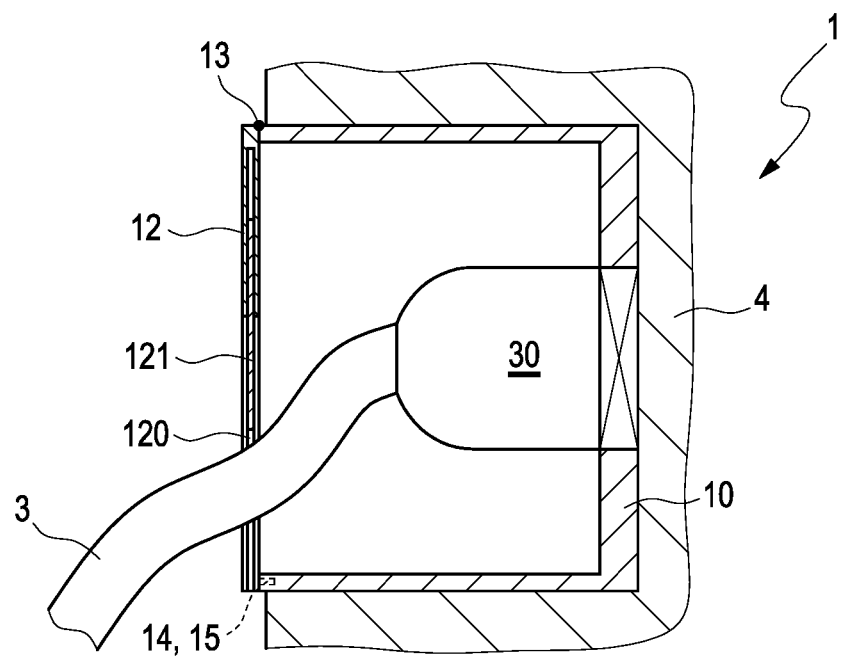
FIG. 3 shows in a lateral cross sectional view, the junction box shown in FIG. 2.

FIG. 3 shows in a lateral cross sectional view the junction box 1 shown in FIG. 2. The junction box 1 is built on the outside of an electric vehicle 4 as a charging socket of the electric vehicle 4, i.e., the electric vehicle 4 comprises a charging socket which is configured as the junction box 1.

Figure 4:
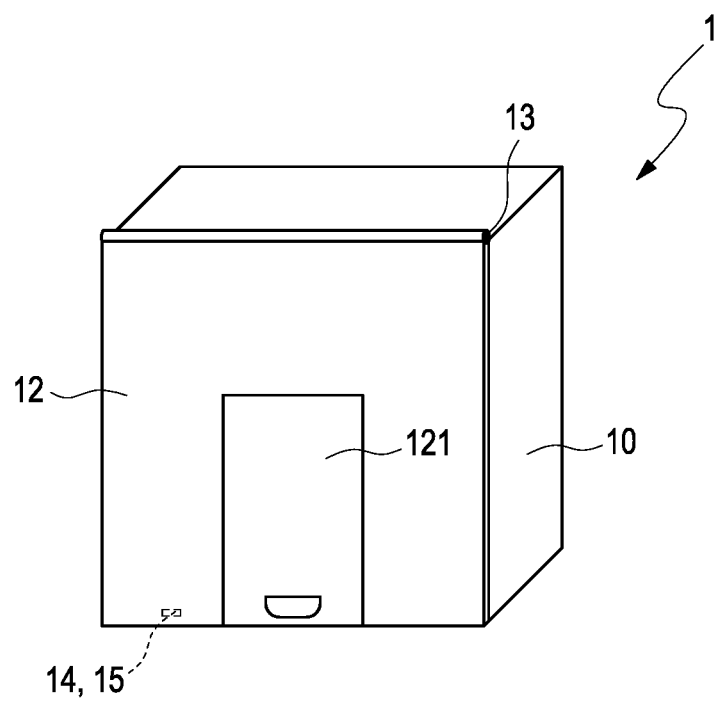
FIG. 4 shows in a top view, the junction box shown in FIG. 2 without the plug inserted.

FIG. 4 shows in a top view the junction box 1 shown in FIG. 2 without the plug inserted. The slider 121 is in a closed position, i.e., the passage 120 is closed.

Figure 5:
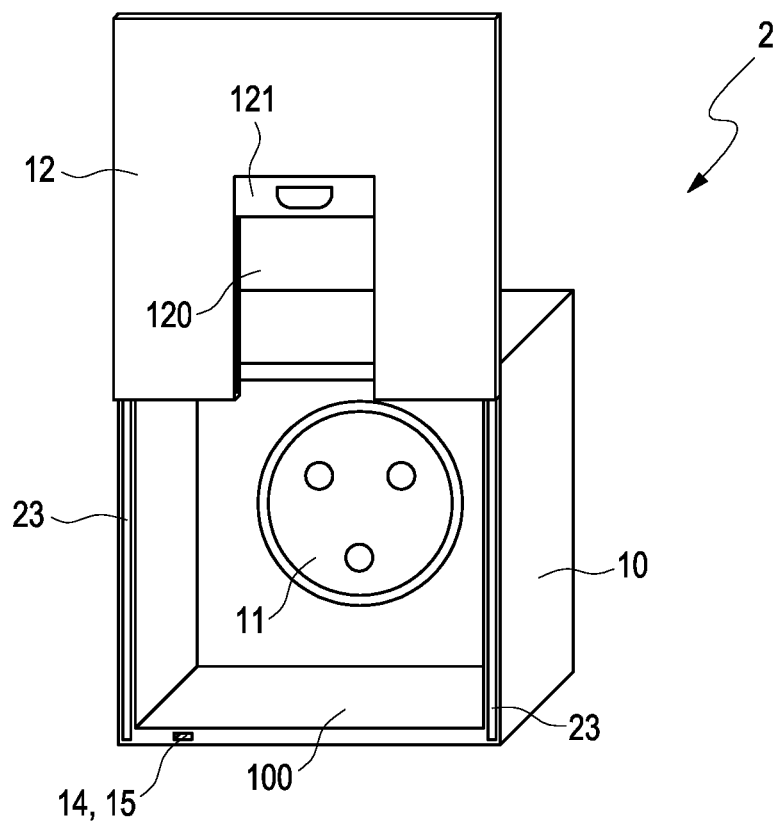
FIG. 5 shows in a top view, a junction box according to a second embodiment.

FIG. 5 shows in a top view a junction box 2 according to a second embodiment. The junction box 2 comprises a housing 10 and a socket 11 arranged in the housing 10 for plugging in a plug 30 of a cable 3. Moreover, the junction box 3 comprises a cover 12 movably mounted on the housing 10 and covering an opening 100 of the housing 10 in a covering position, having a passage 120 for the cable 3. The passage 120 has a smaller largest interior dimension than the smallest exterior dimension of the plug 30.

The junction box 2 has the same basic construction as the junction box 1 according to the first embodiment, as shown in FIGS. 1 to 4. As a difference from the junction box 1, the cover 12 can be mounted on the housing 10 movably relative to the housing 10. The junction box 2 then comprises a guide rail 23 for the cover 12, arranged at a marginal region of the housing 10 defining the opening 100, but no hinge.

In order to operate the junction box 1, 2, at first the junction box 1, 2 is provided. The opening 100 of the housing 10 is opened by moving the cover 12. A plug 30 of a cable 3 is then inserted into the socket 11 and the cable 3 is led through the passage 120 of the cover 12. Finally, the opening 100 of the housing 10 is covered by moving the cover 12, i.e., the cover 12 is moved into the covering position.

In some embodiments, the cover 12 will be locked by the locking mechanism 14 in the covering position and the junction box 1, 2 will be closed by the closure mechanism 15.

German patent application no. 10 2022 112557.2, filed May 19, 2022, to which this application claims priority, is hereby incorporated herein by reference, in its entirety.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An electric vehicle, comprising:
   a vehicle exterior; and
   a charging socket assembly situated at the vehicle exterior, the charging socket assembly configured as a junction box that includes:
      a housing;
      a single charging socket arranged in the housing for plugging in a plug of a cable of a vehicle charging device; and
      a cover movably mounted on the housing to move between an open position and a covering position, in which the cover covers an opening of the housing in the covering position,
      wherein the cover includes a cable passage for the cable with a smaller largest interior dimension than the smallest exterior dimension of the plug of the cable such that the plug of the cable is incapable of passing through the cable passage,
      wherein the cover is movable from the open position to the covering position while the plug of the cable of the vehicle charging device is engaged in the single charging socket by enabling the cable to pass through the cable passage of the cover as the cover transitions from the open position to the covering position, and
      wherein the cover assists in securing the plug of the cable of the vehicle charging device in the single charging socket of the junction box when the cover is in the covering position by preventing the plug from being withdrawn from the electric vehicle.

2. The electric vehicle according to claim 1, wherein the cover is mounted on the housing so that the cover can swivel relative to the housing, and comprising a hinge connecting the cover to a marginal region of the housing which defines the opening.

3. The electric vehicle according to claim 1, wherein the cover is mounted movably on the housing relative to the housing, and comprising a guide rail for the cover, situated at a marginal region of the housing which defines the opening.

4. The electric vehicle according to claim 1, wherein the cable passage is formed as a slot in the cover, which starts from one edge of the cover and extends to a central region of the cover and which has a width defining a maximum diameter of the cable.

5. The electric vehicle according to claim 4, wherein the cover further comprises a slider movably mounted on the cover within the cable passage for selectively revealing or closing the cable passage such that the cable passage in the cover can be closed when the electric vehicle is not being charged via the vehicle charging device.

6. The electric vehicle according to claim 1, further comprising a locking mechanism for locking the cover in the covering position.

7. The electric vehicle according to claim 6, further comprising a closure mechanism for closing the housing with the cover locked in the covering position.

8. A method of charging an electric vehicle having a junction box provided at an exterior of the electric vehicle, the junction box having a housing, a single charging socket arranged in the housing for plugging in a plug of a cable of a vehicle charging device, and a cover movably mounted on the housing to move between an open position and a covering position, in which the cover covers an opening of the housing in the covering position, wherein the cover includes a cable passage for the cable with a smaller largest interior dimension than the smallest exterior dimension of the plug of the cable such that the plug of the cable is incapable of passing through the cable passage, the method of charging the electric vehicle comprising:
   moving the cover of the junction box provided at the exterior of the electric vehicle to the open position to open the opening of the housing and provide access to the single charging socket;
   inserting the plug of the cable of the vehicle charging device into the single charging socket of the junction box while the cover is in the open position;
   leading the cable through the cable passage of the cover of the junction box;
   moving the cover of the junction box to the covering position to cover the opening of the housing while the plug of the cable of the vehicle charging device is engaged in the single charging socket to assist in securing the plug of the cable of the vehicle charging device in the single charging socket of the junction box; and
   charging the electric vehicle with the vehicle charging device while the cover remains in the covering position and the cable extends through the cable passage.

* * * * *